E. E. MILLIKEN.
POTATO PICK-UP.
APPLICATION FILED NOV. 8, 1909.
973,539.
Patented Oct. 25, 1910.
2 SHEETS—SHEET 1.
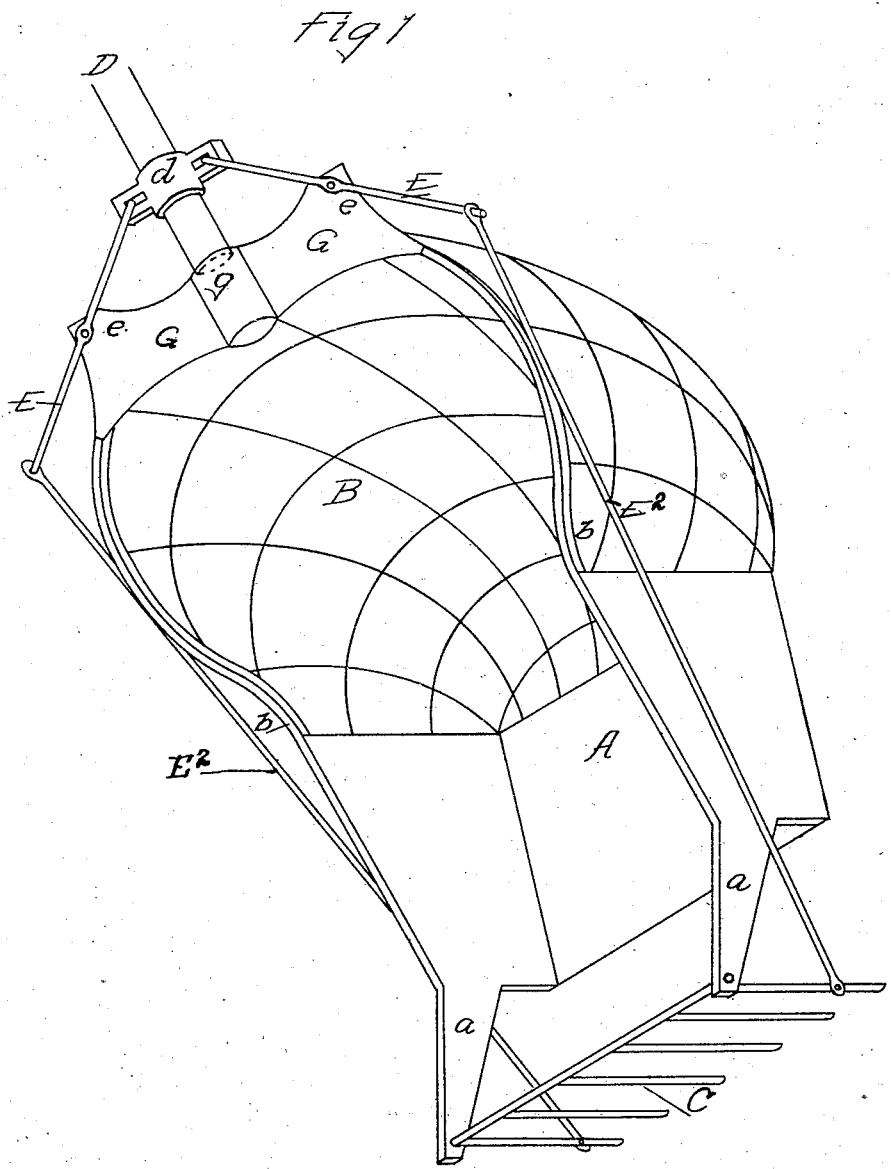

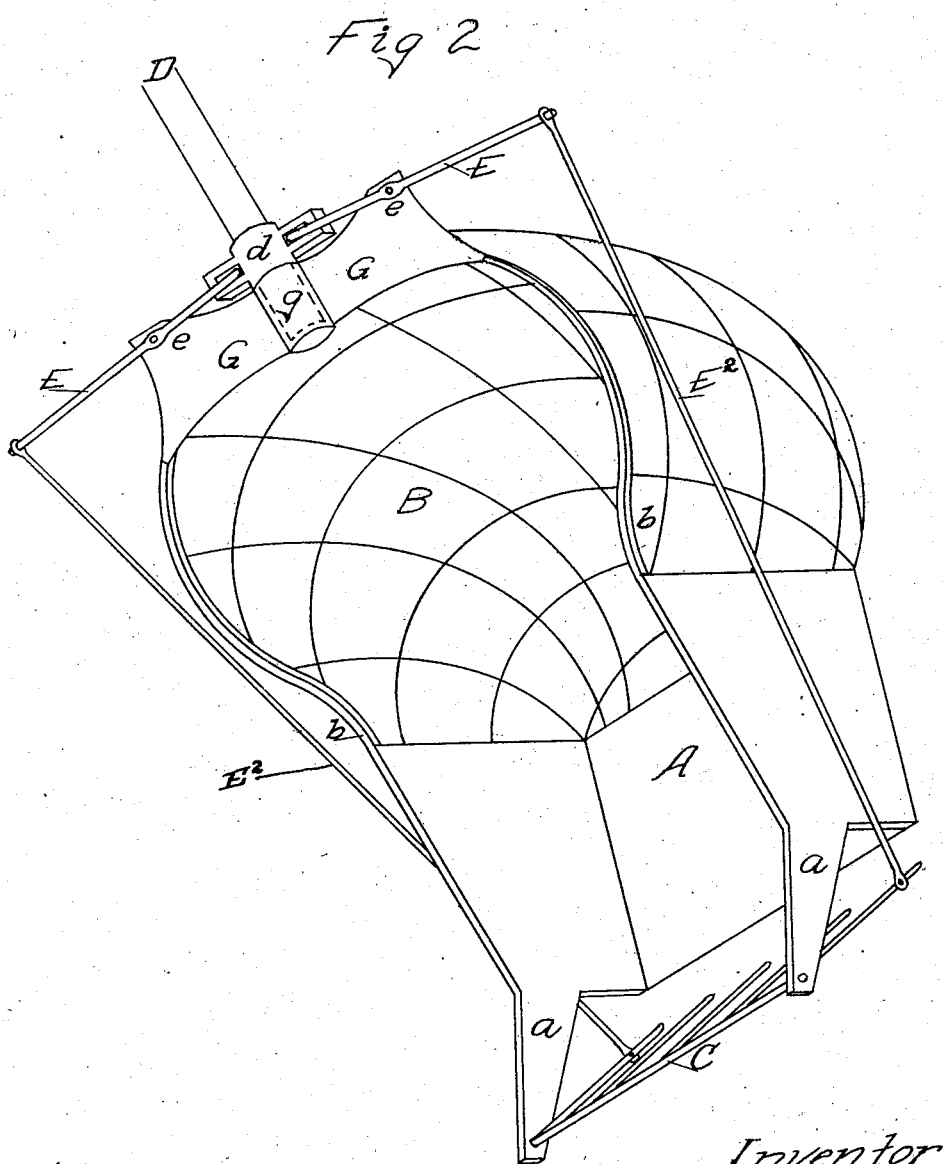

UNITED STATES PATENT OFFICE.

ELMER E. MILLIKEN, OF BRIDGEWATER, MAINE.

POTATO PICK-UP.

973,539.  Specification of Letters Patent.  Patented Oct. 25, 1910.

Application filed November 8, 1909. Serial No. 526,933.

*To all whom it may concern:*

Be it known that I, ELMER E. MILLIKEN, citizen of the United States, residing at Bridgewater, in the county of Aroostook and State of Maine, have invented certain new and useful Improvements in Potato Pick-Ups, of which the following is a specification.

This invention relates to a device herein termed "a potato pick-up" and adapted to pick up potatoes or other vegetables or objects from the ground.

Potatoes as commonly harvested whether dug by a machine or with a hoe are left lying upon the ground and it is usually necessary to pick the potatoes up by hand one at a time. This is obviously a slow and tiresome operation.

The present invention provides a device which can be readily and easily handled while standing in an upright position and which can pick up one or more potatoes at a time, and which is provided with a basket for holding a considerable number of potatoes. The potatoes may thus be gathered from the ground rapidly and easily.

The invention may take various forms but one of which is illustrated in the drawings.

The invention will more fully appear from the accompanying description and drawings and will be particularly pointed out in the claims.

The drawings illustrate one form of device embodying the invention.

In the drawings Figure 1 is an isometric view of the pick-up with the handle portion broken off and with the lifter shown in open position away from the mouth of the scoop; Fig. 2 is a similar view with the lifter shown in its inward position toward the scoop.

The pick-up embodying this invention comprises essentially a scoop, a lifter, and a handle. The scoop as shown comprises a mouth piece A and a basket B. The parts of the scoop may be of any suitable material but as illustrated the mouth piece A is formed of metal and presents a substantially straight forward edge with up-turned sides. The basket as illustrated is formed of a framework $b$ and of a wire skeleton, and is of sufficient size to hold as many potatoes as can be readily lifted by the operator and turned into a wagon.

At the rear of the scoop the framework $b$ is extended to form a plate G and this plate G is provided with a socket $g$ into which fits and, in the form herein illustrated, slides an extended handle D.

The litfer may take any suitable form and is herein illustrated at C made in the form of a rake. The lifter in performing its function is given a movement toward and from the mouth of the scoop so that when it is in its position away from the mouth of the scoop there is sufficient space between it and the scoop to receive the potatoes lying upon the ground, and as it is moved toward the scoop it lifts or pushes the potatoes into the scoop.

In the form of the invention illustrated the lifter is pivoted at the forward end of lugs $a$ $a$ formed on and projecting from the scoop and has its movement toward and from the scoop by swinging about its pivot.

The operation of the lifter is secured by means operated by the handle. In the form shown the handle is provided with a collar $d$ rigidly attached thereto. A pair of levers E E are pivoted at $e$ $e$ on the plate G, engage at one end slots in the collar $d$, and are pivoted at the other end to links $E^2$ $E^2$ which are in turn connected to the lifter C. It will thus be seen that as the handle D is moved relatively to the scoop sliding in the socket $g$ the lifter C will be moved to and from the scoop.

The parts of the pick-up are so proportioned that when the scoop rests upon the ground and the handle is retracted in the position shown in Fig. 1 there will be sufficient space between the edge of the scoop and the lifter to allow the scoop to be placed over the potatoes lying upon the ground. When the handle is grasped the parts naturally take this position, the weight of the scoop causing it to slide down the handle into this position. The operator after placing the scoop over the potatoes, and in position shown in Fig. 1, then pushes the handle D downwardly toward the scoop causing the litfer to swing inwardly toward the scoop to the position shown in Fig. 2 and thus lift or throw the potatoes into the scoop. The operation is repeated as often as desired or until the basket is filled when it is dumped into a suitable receptacle.

It is to be understood that the invention is not limited to the particular arrangement and construction illustrated in the drawings, nor otherwise than as set forth in the appended claims.

Having fully described my invention what I claim as new and desire to secure by Letters Patent is:

1. A potato pick-up comprising a scoop, a lifter movable toward and from the mouth of the scoop, a handle for the scoop and means operated by said handle for moving the lifter toward and from the scoop.

2. A potato pick-up comprising a scoop, a lifter movable toward and from the mouth of the scoop, a handle for said scoop connected to and movable longitudinally of the scoop, and connections between said handle and said lifter for causing the operation of the lifter upon the movement of the handle.

3. A potato pick-up comprising a scoop, a lifter movable toward and from the mouth of the scoop, a handle for said scoop connected to and movable longitudinally of the scoop, lever connections between the handle and the lifter whereby the handle and the lifter will move simultaneously toward and from the scoop.

4. A potato pick-up comprising a scoop, the said scoop having a straight edged mouth-piece to rest upon the ground, a framework, and a reticulated basket to receive and hold the potatoes, a lifter movable toward and from the mouth-piece of the scoop, a handle, and means operated by the handle for moving the lifter.

5. A potato pick-up comprising a scoop to receive the potatoes, the said scoop formed with lugs projecting forward from its mouth, a lifter pivotally mounted in said lugs transversely of the mouth and adapted to swing toward and from the mouth of the scoop, and means for operating the lifter.

6. A potato pick-up comprising a scoop to receive the potatoes, the said scoop formed with lugs projecting forward from its mouth, a lifter pivotally mounted in said lugs transversely of the mouth and adapted to swing toward and from the mouth of the scoop, and means operated by the handle for swinging the lifter.

7. A potato pick-up comprising a scoop to receive the potatoes, the said scoop formed with lugs projecting forward from its mouth, a lifter pivotally mounted in said lugs transversely of the mouth and adapted to swing toward and from the mouth of the scoop, a handle connected to and movable longitudinally of the scoop, and connections between said handle and said lifter for causing the swinging of the lifter upon the movement of the handle.

ELMER E. MILLIKEN.

Witnesses:
RUBY I. NASEN,
ETTA E. GLASTER.